July 31, 1928.

V. R. ROSTEK

BROODER FOR CHICKENS

Filed July 22, 1927

Inventor
Vincent R. Rostek
By W. W. Williamson
Atty.

July 31, 1928.

V. R. ROSTEK 1,679,009

BROODER FOR CHICKENS

Filed July 22, 1927

Inventor
Vincent R. Rostek
By W. W. Williamson

Patented July 31, 1928.

1,679,009

UNITED STATES PATENT OFFICE.

VINCENT R. ROSTEK, OF PHILADELPHIA, PENNSYLVANIA.

BROODER FOR CHICKENS.

Application filed July 22, 1927. Serial No. 207,710.

My invention relates to certain new and useful improvements in chicken brooders and has for its object to produce a brooder which will be simple, cheap and at the same time effective for the purposes intended; a further object is to provide for adjusting the cover or top for the accommodation of the chicks as they grow, and prevent them from climbing on top of each other to the extent of suffocating those underneath; a still further object is to provide a luminous lure to induce the chicks to pass entirely within the brooder when entering the passageway and thus overcome the tendency to choke the entrance and exclude the chicks following; and further to provide for heating the interior of the brooder and also the top or cover thereof from the same lamp that provides the light for the lure.

Another and important object is to provide for closing the brooder at nights against rats and the like, but giving ample ventilation for the chicks.

With these ends in view, this invention consists in the details of construction and combination of elements hereinafter set forth and then specifically designated by the claims.

In order that those skilled in the art to which this invention appertains may understand how to use and make the same, I will describe its construction in detail, referring by numerals to the accompanying drawings forming a part of this application, in which.

Figure 1:
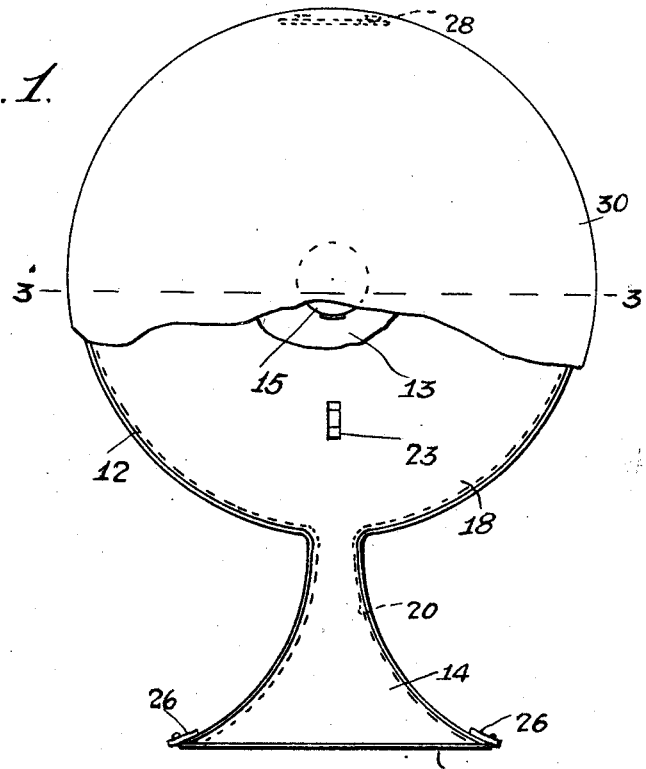
Fig. 1 is a plan view of my improved brooder, the cover and dome being partly broken away.
Figure 2:
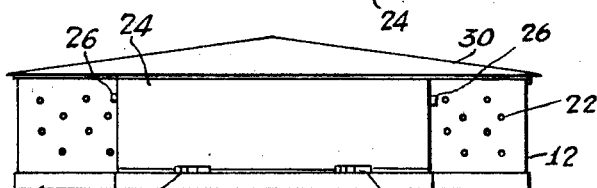
Fig. 2 is a front elevation of the brooder.
Figure 3:
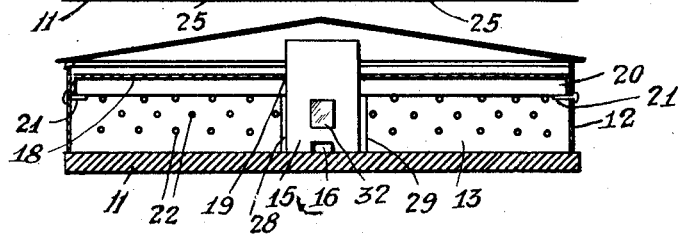
Fig. 3 is a section at the line 3—3 of Fig. 1, the lamp housing being left in elevation.

In carrying out my invention as herein embodied, I provide a base or floor 11 upon which is secured an enclosing wall or casing 12, preferably of sheet metal, and the space 13 enclosed by this casing is preferably circular, having leading thereto a flared runway 14.

In the center of the space 13 is located a lamp housing 15, secured to the floor 11, having inlets 16 for furnishing air to the lamp 17 to support combustion and carry off stale air from the interior of the brooder.

18 represents the cover or top, having an opening 19 therein for passing over the lamp housing 15, this cover is shaped to fit within the casing 12 and cover both the circular space 13 and the runway 14, and is also adapted to be raised and lowered relative to the casing in order that it may be adjusted up or down to vary the space between it and the floor. By this arrangement the chicks during the various stages of growth are prevented from climbing on top of each other, which has heretofore caused the suffocating or mashing of those underneath.

The cover 18 is preferably provided with a flange 20 adding strength thereto and for supporting this cover in any adjustment by resting upon pins or plugs 21 passed through certain of the holes 22, a sufficient number of these holes being formed in the casing to accomplish any desired adjustment of the cover and also to give proper ventilation to the chicks.

The finger holds 23 facilitate raising and lowering the top or the removal and replacement of the same.

Figure 4:
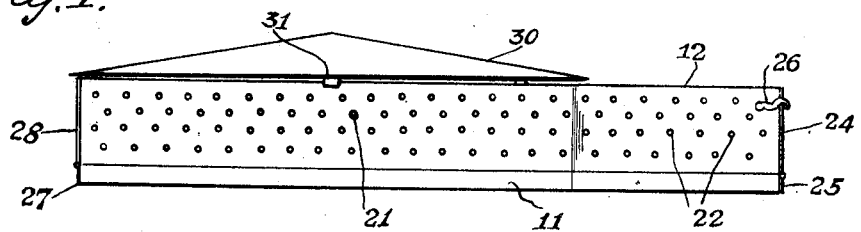
Fig. 4 is a side elevation of the brooder, the gangways being shown closed.
Figure 5:
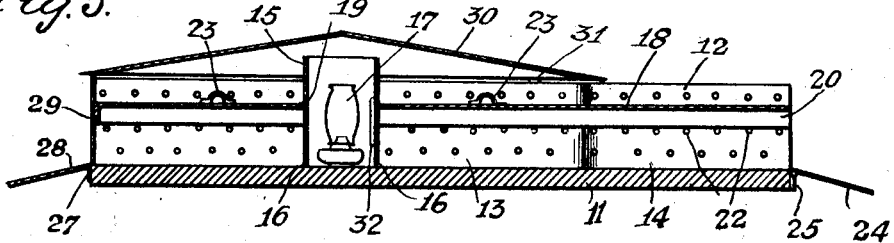
Fig. 5 is a central longitudinal section of Fig. 4, the gangways being open.
Figure 6:
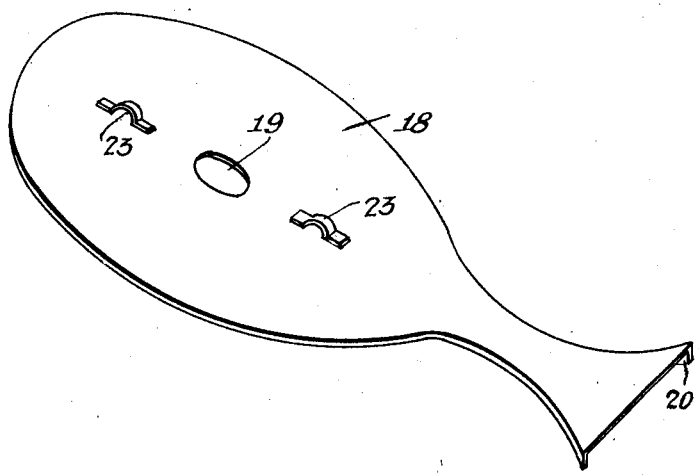
Fig. 6 is a perspective view of the adjustable top or cover.

24 represents a gangway which is hinged to the floor at the outer end of the runway as indicated at 25 in order that this gangway may be swung down to the position shown in Fig. 5 for giving the chicks easy access to the runway, or it may be swung up to the position shown in Fig. 4, for closing the runway and preventing the egress of the chicks or ingress of rats or the like; a suitable means for fastening it in this closed position, such as one or more hooks 26, being provided.

To the opposite side of the casing from the gangway 24 is hinged, as at 27, a secondary gangway 28, which may be turned down as shown in Fig. 5, or swung up as shown in Fig. 4, for closing the opening 29 in the casing. When both of these gangways are closed the chicks will be securely shut in and rats shut out of the brooder.

30 represents a hood having the lugs 31 for resting upon the upper edge of the casing thereby supporting this hood over the brooder and spacing said hood above the casing to provide for the lamp 17, thus sufficiently confining this heated air to properly heat the cover and through it the interior of the brooder.

An opening is formed in lamp housing 15 in line with the runway 14 and this opening is covered with pane 32, such as glass or mica so that light from the lamp will shine toward the runway and lure the chicks from the runway into the body of the brooder, as will be readily understood.

From the foregoing description the operation and utilization of my improved brooder will be obviously as follows:

When the brooder is to be used for very young chicks, the cover 18 is adjusted sufficiently low to just allow standing height for such chicks which will effectually prevent injury to them by piling up, but as they grow the cover is raised step by step to maintain this condition.

When the gangways are open as during the day, the chicks may go in and out of the brooder freely, and when the lamp is lit, sufficient heat will be maintained inside the brooder for the comfort of the chicks, while when the gangways are closed the chicks will be securely protected and at the same time have ample ventilation.

Of course I do not wish to be limited to the exact details of construction as herein shown, as these may be varied within the limits of the appended claims without departing from the spirit of my invention.

Having fully described my invention, what I claim as new and useful is:

1. In a brooder, a base; a casing supported upon said base; a lamp housing projecting upward from the base within said casing, said housing having an opening covered with transparent material; a runway leading to the interior of the brooder in line with said covered opening; an adjustable cover having an opening therein for passing over the housing; a hood spaced from the upper edge of the casing causing the heated air issuing from the housing to heat the cover; and gangways for facilitating ingress to and egress from the interior of the brooder and also for shutting off access thereto.

2. A brooder comprising a base; a perforated casing secured to the base and enclosing a circular space for the housing of chicks; and also enclosing a flared runway, the narrow portion of the latter opening into the circular space; an adjustable cover fitting within the casing; means for supporting said cover in any adjustment; a lamp inclosure secured to the base and projecting through an opening in the cover; a transparent section on the lamp inclosure for projecting a portion of the rays of a lamp toward the runway; a hood so positioned over the brooder as to restrict the outflow of hot air arising from the lamp to cause the heating of the cover; a hinged gangway which is adapted to close over the mouth of said runway; and a second hinged gangway for closing an opening in the casing opposite the first gangway.

In testimony whereof, I have hereunto affixed my signature.

VINCENT R. ROSTEK.